United States Patent Office 3,117,145
Patented Jan. 7, 1964

3,117,145
METHOD OF PURIFYING VINYL ESTERS OF ORGANIC CARBOXYLIC ACIDS
John E. Ehrreich, Arlington, Mass., assignor to W. R. Grace & Co., Cambridge, Mass., a corporation of Connecticut
No Drawing. Filed Aug. 31, 1961, Ser. No. 135,130
6 Claims. (Cl. 260—410.9)

This invention relates to the recovery of vinyl esters from mixtures of the esters with organic carboxylic acids from which they have been derived and with mercury compounds which have been used as catalysts in their manufacture.

Vinyl esters of higher carboxylic acids are frequently produced by a vinyl interchange reaction. A carboxylic acid is reacted with the vinyl ester of a lower fatty acid, usually vinyl acetate, in the presence of catalytic amounts of the mercuric salts of strong acids. The separation of the vinyl ester so produced from unreacted carboxylic acid is one of the more difficult aspects of this process. Removal of the mercury compounds from the reaction mixture or recovery of the purified vinyl ester free from contamination by mercury or mercury compounds has also presented serious difficulties.

Various methods have been suggested for separating vinyl esters from their mixtures with carboxylic acids. One method involves the addition of an alkaline material to the reaction mixture of the vinyl interchange process, and the separation of the carboxylic acid salt so-formed from the vinyl ester by various means. When the carboxylic acid in the mixture is a saturated fatty acid, its salt precipitates out in the form of a solid soap and can be removed from the mixture by filtration. The salts of many carboxylic acids are liquids, however, and their removal is somewhat more difficult. In such cases, the vinyl ester has been extracted successfully from the neutralized mixture by means of a solvent for the vinyl ester. Alternatively, mixtures of vinyl esters and carboxylic acids from which all traces of mercury have previously been removed have been neutralized by the addition of an alkaline material, and the neutralized mixture has then been flash distilled to recover the vinyl ester.

In another process, the amount of fatty acid present in the reaction mixture is first reduced by cooling the mixture to crystallize a large proportion of the fatty acid, which is then removed by filtration, a purified vinyl ester product is thereafter recovered by distilling the remaining low acid-content mixture in a molecular still. More recently, the unreacted carboxylic acids have been converted to higher boiling products by heating the mixture of acid and vinyl ester with a small amount of sulfuric acid, after which a vinyl ester product of low acid content can be recovered by distillation.

The removal of the mercury compounds contained in the vinyl interchange reaction mixture presents an equally difficult problem and one for which few solutions have been found. As a result, many of the vinyl esters presently commercially available are contaminated with mercury or mercury compounds and are therefore unsuitable for use as raw materials for the production of plasticizers or other products which may come into contact with food. In addition, the presence of mercury compounds makes separation of the vinyl esters from the other ingredients of the reaction mixture, particularly the unreacted carboxylic acids, more difficult and hampers the ultimate recovery of the vinyl esters in purified form. Mercury salts catalyze the decomposition of the vinyl esters and the formation of ethylidene diesters and also bring about polymerization of the vinyl esters during the final distillation step. Loss of the vinyl ester product is the inevitable result of these undesirable side reactions.

Two different approaches have been taken in the past to the problem of mercury contamination. One has been to keep the distillation temperatures as low as possible throughout the recovery of the vinyl esters to minimize collection of mercury or mercury compounds with the vinyl ester and to reduce the amount of product lost through side-reactions. This solution has been only partly successful, as evidenced by the mercury contamination frequently found in commercially available vinyl esters. The other, and more successful, method of avoiding mercury contamination is that described in United States Patent No. 3,000,918, issued September 19, 1961. In this process, the vinyl interchange reaction mixture is washed with an acidified sodium bromide solution to form a water soluble mercury-sodium bromide complex, which separates from the reaction mixture with the aqueous solution used for the washing. The concentration of mercury salts may be reduced in this manner from the 3,000 parts per million (p.p.m.) frequently present in the reaction mixture to as little as 1 p.p.m. or even less. The separation of unreacted acid from the vinyl ester and final distillation of the ester may then be accomplished without difficulty or loss of product, and a mercury-free product may be collected.

The above-described processes, while successfully separating vinyl esters from carboxylic acids and mercury compounds, involve a number of tedious, expensive and time-consuming procedures, especially when a product having both a low mercury and a low acid content is desired. In the method of this invention the mercury and acid are removed simultaneously from vinyl esters produced by a vinyl interchange reaction. The process is simple and direct, and avoids the complicated washing, filtering and liquid separation steps of the prior art processes.

This invention is predicated on the discovery that vinyl esters can be recovered from their mixtures with mercury compounds and organic carboxylic acids by first neutralizing the carboxylic acids by the addition of at least a stoichiometric amount of an alkali metal hydroxide, and then flash distilling the neutralized mixture. By "flash distilling" is meant a distillation procedure providing a low residence time of the vinyl ester in the distillation apparatus, for example as in molecular stills and the so-called "film-type evaporators."

This invention will be more clearly understood by means of the following examples.

*Example I*

A mixture of lauric acid and myristic acid was converted to vinyl laurate and vinyl myristate by the vinyl interchange reaction of the acids with vinyl acetate, using mercuric sulfate as a catalyst. After the excess vinyl acetate and the acetic acid formed during the reaction had been stripped from the reaction mixture, the crude vinyl ester product contained 7 percent by weight of the acid mixture and 1300 p.p.m. of mercury. The crude product (403 pounds) was neutralized by the addition, with stirring, of 16 pounds of a 50 percent potassium hydroxide solution, and was then distilled in a film-type evaporator with an overhead of about 45 percent. The unit used was standard Kontro Ajust-O-Film horizontal processing unit having one square foot of evaporation area (The Kontro Company, Inc., Petersham, Mass.). The feed rate was about 40 pounds per hour; a vacuum was maintained at about 0.9 mm. of mercury; the jacket temperature was 135° C. and the vapor temperature was about 115° C. About 155 pounds of clear product containing 1.8 percent acid and 2 p.p.m. of mercury was collected. The residue was again passed through the evaporator, this time with a 50 percent overhead, a feed rate of about 50 pounds per hour, a vacuum of 0.8 mm., jacket temperature of 135° C. and a vapor temperature of 111°

C. About 145 pounds of vinyl ester product containing 2.0 percent acid and 6 p.p.m. of mercury was collected. The combined product of the two runs, 300 pounds by weight, had an acid content of 1.9 percent and a mercury content of 4 p.p.m.

*Example II*

A mixture of vinyl laurate and vinyl myristate formed by the vinyl interchange reaction was found to contain 8.5 weight percent acid and 1100 p.p.m. of mercury. 25 pounds by weight of this mixture, which had been neutralized by the addition of 1.1 pounds of a 50 percent solution of potassium hydroxide, was distilled in the above described film-type evaporator with an overhead of 84 percent, under substantially the same operating conditions as described in Example I. The purified vinyl ester had an acid content of 1 percent and a mercury content of less than 2 p.p.m.

Another portion of the same crude vinyl laurate-vinyl myristate mixture containing 8.5 percent of acid and 1100 p.p.m. of mercury was distilled in the film-type evaporator under the same conditions except that the mixture had not been neutralized. The vinyl ester product which was collected was found to contain 6 percent of acid and 78 p.p.m. of mercury, and was unsuitable for use without further purification.

The process shown in the above examples affords a simple, direct and most efficient method for recovering vinyl ester monomers in a purified condition without resorting to the previously used techniques of filtering, washing and liquid separation. This process can be used not only for the purification of vinyl esters derived from saturated fatty acids, such as those of the examples, but can be applied with equal success to the vinyl esters of a wide variety of carboxylic acids. The carboxylic acid used can have in the range of 4 to 24 or more carbon atoms per molecule. For example, N-butyl vinyl maleate, which is formed by the vinyl interchange reaction between vinyl acetate and mono-n-butyl maleate, may be separated from the unreacted half-ester and the mercury catalyst by adding an alkali hydroxide to the reaction mixture and flash distilling, the resultant product having both a low acid and a low mercury content. The process of this invention is of particular importance in this case, since the alkali salt of mono-n-butyl maleate is a liquid and hence cannot be separated from the neutralized mixture by filtration. The vinyl esters of other fatty acids, as for example vinyl pelargonate or vinyl stearate, or of other half-esters of dibasic acids, as for example vinyl lauryl phthalate or vinyl 2-ethylhexyl phthalate, as well as the vinyl esters of tall oil, hydrogenated rosin acid, oleic acid, p-tertiary butyl benzoic acid may also be separated from unreacted acids and from mercury contaminants by following the process of this invention.

While any strongly alkaline material can be used in the neutralization step of this process, it is preferred to use the alkali metal hydroxides, namely sodium, potassium or lithium hydroxide. The choice of alkaline material may be governed to some extent by the nature of the alkali salt of the particular carboxylic acid which is present in the mixture to be purified. Potassium hydroxide is generally preferred, for example, for use with mixtures containing fatty acids, since the potassium soaps of these acids are liquid or semi-solid and therefore can be handled more readily in the distillation apparatus than the solid sodium soaps. The amount of alkali added in the neutralization step must be at least the stoichiometric equivalent of the carboxylic acid present in the mixture, and is preferably about 2–2.5 weight percent in excess of this amount.

The type of distillation apparatus which is preferred is the film-type evaporator used in the examples. Any of the well-known types of distillation equipment, however, which make possible an extremely short residence or contact time and which are able to handle solid or semi-solid bottoms can be used in the process.

What is claimed is:

1. In a vinyl interchange reaction wherein a carboxylic acid is reacted with an excess of a vinyl ester of a lower fatty acid in the presence of a mercury catalyst and the lower fatty acid formed by said interchange and the unreacted excess of vinyl ester are removed, leaving as residue a crude mixture comprised of the interchanged vinyl ester, unreacted carboxylic acid and mercury catalyst, the improvement which consists in adding to the residual crude mixture an amount of an alkali metal hydroxide which is at least stoichiometrically equivalent to the unreacted carboxylic acid in said mixture and thereafter flash distilling the neutralized mixture, whereby the interchange vinyl ester is separated therefrom in highly purified form.

2. The process of claim 1 wherein the amount of alkali metal hydroxide exceeds by about two weight percent the amount which is stoichiometric equivalent to the amount of free carboxylic acid present in the mixture.

3. The process of claim 1 wherein the interchanged vinyl ester comprises a mixture of vinyl myristate and vinyl laurate and, the unreacted carboxylic acid is a mixture of myristic acid and lauric acid.

4. The process of claim 1 wherein the alkali metal hydroxide is potassium hydroxide.

5. The process of claim 1 wherein the vinyl ester of a lower fatty acid is vinyl acetate.

6. The process of claim 1 wherein the carboxylic acid is a fatty acid.

References Cited in the file of this patent
UNITED STATES PATENTS

| | | |
|---|---|---|
| 2,586,860 | Port et al. | Feb. 26, 1952 |
| 2,997,494 | Brown | Aug. 22, 1961 |
| 2,997,495 | Rutledge et al. | Aug. 22, 1961 |